US011853879B2

(12) United States Patent
Le

(10) Patent No.: US 11,853,879 B2
(45) Date of Patent: *Dec. 26, 2023

(54) GENERATING VECTOR REPRESENTATIONS OF DOCUMENTS

(71) Applicant: Google LLC, Mountain View, CA (US)

(72) Inventor: Quoc V. Le, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 813 days.

This patent is subject to a terminal disclaimer.

(21) Appl. No.: 16/523,766

(22) Filed: Jul. 26, 2019

(65) Prior Publication Data

US 2019/0347552 A1 Nov. 14, 2019

Related U.S. Application Data

(63) Continuation of application No. 14/609,869, filed on Jan. 30, 2015, now Pat. No. 10,366,327.

(Continued)

(51) Int. Cl.
*G06N 3/08* (2023.01)
*G06N 3/04* (2023.01)
(Continued)

(52) U.S. Cl.
CPC ............. *G06N 3/08* (2013.01); *G06F 16/583* (2019.01); *G06F 40/284* (2020.01); *G06N 3/04* (2013.01); *G06N 3/084* (2013.01)

(58) Field of Classification Search
CPC ............. G06N 3/08; G06N 3/04; G06N 3/084
See application file for complete search history.

(56) References Cited

U.S. PATENT DOCUMENTS

2014/0229158 A1* 8/2014 Zweig ...................... G06N 3/04
704/9

FOREIGN PATENT DOCUMENTS

CN 101887443 A 11/2010
CN 102968410 A 3/2013
(Continued)

OTHER PUBLICATIONS

Collobert, R., Weston, J., Bottou, L., Karlen, M., Kavukcuoglu, K., & Kuksa, P. (2011). Natural language processing (almost) from scratch. Journal of machine learning research, 12(Article), 2493-2537. (Year: 2011).*

(Continued)

*Primary Examiner* — Ying Yu Chen
*Assistant Examiner* — Lokesha G Patel
(74) *Attorney, Agent, or Firm* — Fish & Richardson P.C.

(57) ABSTRACT

Methods, systems, and apparatus, including computer programs encoded on computer storage media, for generating document vector representations. One of the methods includes obtaining a new document; and determining a vector representation for the new document using a trained neural network system, wherein the trained neural network system has been trained to receive an input document and a sequence of words from the input document and to generate a respective word score for each word in a set of words, wherein each of the respective word scores represents a predicted likelihood that the corresponding word follows a last word in the sequence in the input document, and wherein determining the vector representation for the new document using the trained neural network system comprises iteratively providing each of the plurality of sequences of words to the trained neural network system to determine the vector representation for the new document using gradient descent.

20 Claims, 4 Drawing Sheets

Related U.S. Application Data

(60) Provisional application No. 61/934,674, filed on Jan. 31, 2014.

(51) Int. Cl.
   *G06N 3/084* (2023.01)
   *G06F 16/583* (2019.01)
   *G06F 40/284* (2020.01)

(56) References Cited

FOREIGN PATENT DOCUMENTS

| JP | H06-309293 | 11/1994 |
|---|---|---|
| JP | H08-221439 | 8/1996 |
| JP | 2007-171944 | 7/2007 |

OTHER PUBLICATIONS

Schwenk, H., & Gauvain, J. L. (May 2002). Connectionist language modeling for large vocabulary continuous speech recognition. In 2002 IEEE International Conference on Acoustics, Speech, and Signal Processing (vol. 1, pp. I-765). IEEE. (Year: 2002).*

Mikolov, T., Chen, K., Corrado, G., & Dean, J. (2013). Efficient estimation of word representations in vector space. arXiv preprint arXiv:1301.3781. (Year: 2013).*

Huang, E. H., Socher, R., Manning, C. D., & Ng, A. Y. (Jul. 2012). Improving word representations via global context and multiple word prototypes. In Proceedings of the 50th annual meeting of the association for computational linguistics (vol. 1: Long papers) (pp. 873-882). (Year: 2012).*

EP Office Action in European Application No. 15705162.4, dated Dec. 23, 2020, 9 pages.

IN Office Action Indian Application No. 201647029271, dated Sep. 28, 2020, 7 pages (with English translation).

Bengio et al., "A Neural Probabilistic Language Model," Journal of Machine Learning Research, vol. 3, Jan. 1, 2003, pp. 1137-1155, XP055192871.

CN Office Action issued in Chinese Application No. 201580006653.3, dated Jun. 1, 2018, 18 pages (with English translation).

CN Office Action issued in Chinese Application No. 201580006653.3, dated Jan. 11, 2019, 7 pages (with English translation).

International Search Report and Written Opinion in International Application No. PCT/US2015/013717, dated Jun. 11, 2015, 13 pages.

JP Office Action issued in Japanese Application No. 2016-549301, dated Nov. 26, 2018, 6 pages (with English translation).

Le et al., "Distributed Representations of Sentences and Documents," May 16, 2014, XP055192720, Retrieved from the Internet: URL:http://arxiv.org/abs/1405.4053 [retrieved on Jun. 3, 2015], 9 pages.

Mikolov et al., "Distributed Representations of Words and Phrases and their Compositionality," Oct. 16, 2013, XP055192737, Retrieved from the Internet: URL:http://arxiv.org/abs/1310.4546 [retrieved on Jun. 3, 2015], pp. 1-9.

Mikolov et al., "Efficient Estimation of Word Representations in Vector Space", Jan. 16, 2013, XP055192736, Retrieved from the Internet: URL:http://arxiv.org/abs/1301.3781 [retrieved on Jun. 3, 2015], 12 pages.

Mikolov et al., "Exploiting Similarities among Languages for Machine Translation," Sep. 16, 2013, XP055192735, Retrieved from the Internet: URL:http://arxiv.org/abs/1309.4168 [retrieved on Jun. 3, 2015], 10 pages.

Schwenk et al., "Connectionist language modeling for large vocabulary continuous speech recognition," 2002 IEEE International Conference On Acoustics, Speech, and Signal Processing, Proceedings, (ICASSP), May 2002, pp. I-765-I-768.

KR Office Action in Korean Application No. 10-2016-7023661, dated Jun. 20, 2021, 15 pages (with English translation).

* cited by examiner

GENERATING VECTOR REPRESENTATIONS OF DOCUMENTS

CROSS-REFERENCE TO RELATED APPLICATIONS

This application is a continuation application of, and claims priority to, U.S. patent application Ser. No. 14/609,869, for "GENERATING VECTOR REPRESENTATIONS OF DOCUMENTS," filed on Jan. 30, 2015, which claims the benefit of the filing date of U.S. Provisional Application No. 61/934,674, filed on Jan. 31, 2014. The disclosures of the foregoing applications are incorporated here by reference.

BACKGROUND

This specification relates to text classification using data processing systems.

Text classification systems can classify pieces of electronic text, e.g., electronic documents. For example, text classification systems can classify a piece of text as relating to one or more of a set of predetermined topics. Some text classification systems receive as input features of the piece of text and use the features to generate the classification for the piece of text.

Neural networks are machine learning models that employ one or more layers of models to generate an output, e.g., a classification, for a received input. Some neural networks include one or more hidden layers in addition to an output layer. The output of each hidden layer is used as input to the next layer in the network, i.e., the next hidden layer or the output layer of the network. Each layer of the network generates an output from a received input in accordance with current values of a respective set of parameters.

SUMMARY

In general, one innovative aspect of the subject matter described in this specification can be embodied in methods that include the actions of obtaining a new document, wherein the new document includes a plurality of sequences of words, and, for each sequence of words, a word that follows a last word in the sequence of words in the new document; and determining a vector representation for the new document using a trained neural network system, wherein the trained neural network system has been trained to receive an input document and a sequence of words from the input document and to generate a respective word score for each word in a pre-determined set of words, wherein each of the respective word scores represents a predicted likelihood that the corresponding word follows a last word in the sequence in the input document, and wherein determining the vector representation for the new document using the trained neural network system comprises iteratively providing each of the plurality of sequences of words to the trained neural network system to determine the vector representation for the new document using gradient descent.

Other embodiments of this aspect include corresponding computer systems, apparatus, and computer programs recorded on one or more computer storage devices, each configured to perform the actions of the methods.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other aspects can optionally include one or more of the following features. The trained neural network system can include an embedding layer configured to map the input document and each word in the sequence of words from the input document to respective vector representations, a combining layer configured to combine the vector representations into a combined representation, and a classifier layer configured to generate the word scores using the combined representation. The embedding layer can map the words in the sequence of words to vector representations in accordance with a first set of parameters, and the classifier layer can generate the word scores from the combined representation in accordance with a second set of parameters. The values of the first set of parameters and the values of the second set of parameters may be fixed from training the neural network system to generate the word scores.

Determining the vector representation for the new document using the trained neural network system can include performing a respective iteration of gradient descent for each of the plurality of sequences of words to adjust the vector representation of the new document from a previous iteration of gradient descent. Performing the respective iteration of gradient descent for each of the plurality of sequences can include: mapping each of the words in the sequence to a vector representation using the embedding layer; combining the vector representation for the words in the sequence with the vector representation for the new document from the previous iteration to generate a combined representation; generating word scores from the combined representation; computing a gradient using the word scores and the word that follows the sequence in the new document; and adjusting the vector representation for the new document from the previous iteration using the gradient. The combining layer can be configured to concatenate the vector representations of the words in the sequence with the vector representation of the input document. The combining layer can be configured to average the vector representations of the words in the sequence and the vector representation of the input document. Each of the plurality of sequences of words can contain a fixed number of words.

In general, another innovative aspect of the subject matter described in this specification can be embodied in methods that include the actions of obtaining a plurality of training documents, wherein each document in the plurality of training documents includes a plurality of training sequences of words, and, for each sequence of words, a word that follows a last word in the training sequence of words in the training document; and training a neural network system on each of the training documents using gradient descent and back-propagation, wherein the neural network system is configured to receive data identifying an input document and an input sequence of words from the input document and to generate a respective word score for each word in a pre-determined set of words, wherein each of the respective word scores represents a predicted likelihood that the corresponding word follows a last word in the sequence of words in the input document, and wherein training the neural network system on each of the training documents comprises, for each training document, performing a respective iteration of gradient descent for each sequence of words in the training document.

Other embodiments of this aspect include corresponding computer systems, apparatus, and computer programs recorded on one or more computer storage devices, each configured to perform the actions of the methods.

These and other aspects can optionally include one or more of the following features. The neural network system can include an embedding layer configured to map the input document and each word in the sequence of words from the input document to respective vector representations, a combining layer configured to combine the vector representations into a combined representation, and a classifier layer configured to generate the word scores using the combined representation. The embedding layer can map the words in the sequence of words to vector representations in accordance with a first set of parameters, and the classifier layer can generate the word scores from the combined representation in accordance with a second set of parameters. Performing the respective iteration of gradient descent for each of the plurality of sequences in the training document can include: mapping each of the words in the sequence to a vector representation using the embedding layer; mapping the data identifying the training document to a vector representation using the embedding layer; combining the vector representation for the words in the sequence with the vector representation for the training document from the previous iteration to generate a combined representation; generating word scores from the combined representation; computing a gradient using the word scores and the word that follows the sequence in the new document; and adjusting values of the second set of parameters using the gradient. Performing the respective iteration of gradient descent can further include adjusting values of the first set of parameters using backpropagation. The combining layer can be configured to concatenate the vector representations of the words in the sequence with the vector representation of the input document. The combining layer can be configured to average the vector representations of the words in the sequence and the vector representation of the input document. Each of the plurality of sequences of words can contain a fixed number of words.

Particular embodiments of the subject matter described in this specification can be implemented so as to realize one or more of the following advantages. A vector representation of a document that can be used as a feature of the document, e.g., by a text classification system, can be effectively generated. A neural network system can be trained to generate the document representation using only unlabeled training documents. The vector representations generated by the trained neural network system can have several desirable properties. For example, documents that are semantically similar can have document vector representations that are closer together than the document vector representations for two documents that do not include semantically similar content.

An advantage of document vectors is that they are learned from unlabeled data and thus can work well for tasks that do not have enough labeled data. The described techniques outperform bag-of-words models as well as other conventional techniques for text representations. Finally, the techniques achieve new state-of-the-art results on several text classification and sentiment analysis tasks.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
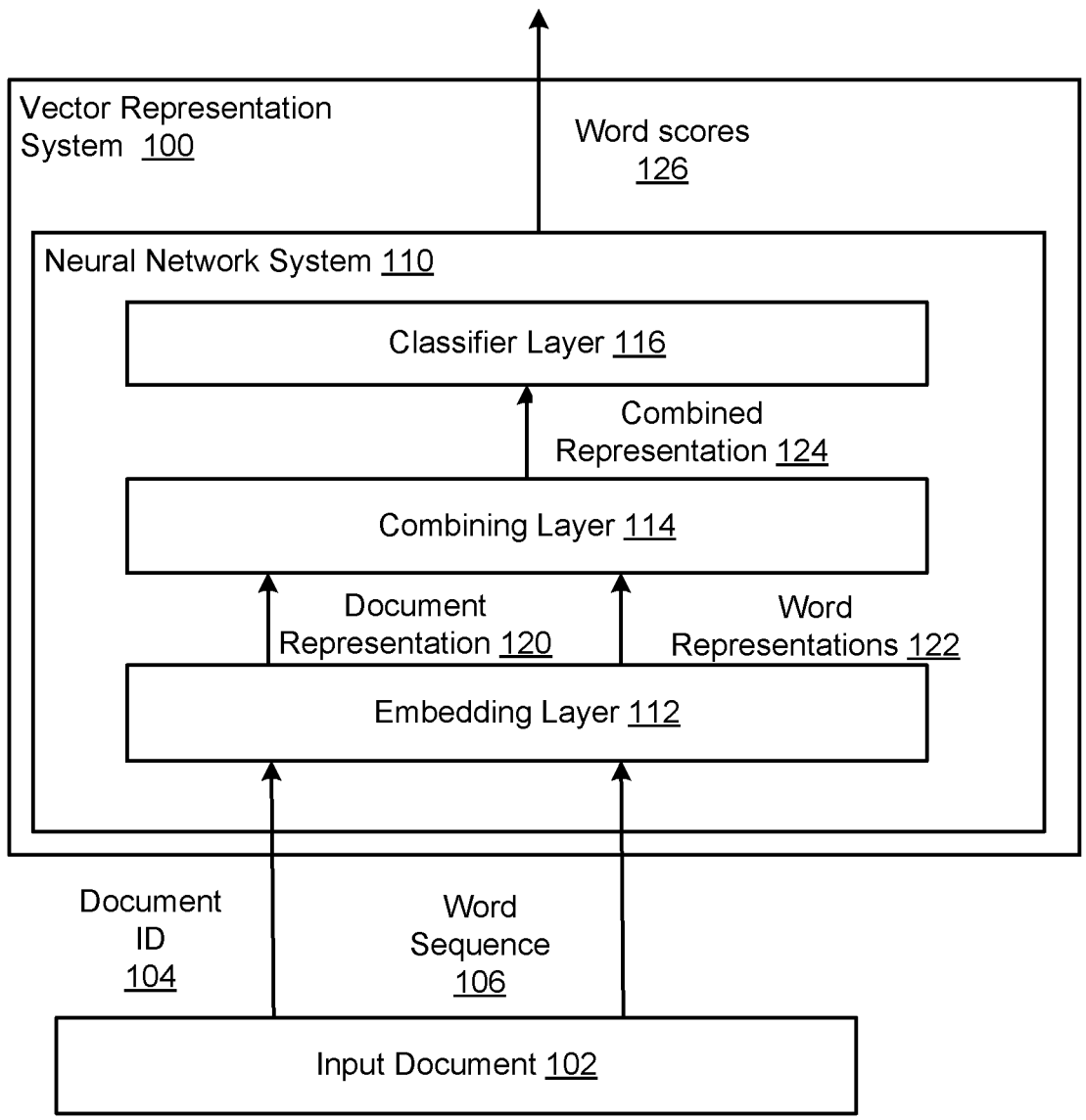
FIG. 1 shows an example vector representation system.

FIG. 1 shows an example vector representation system 100. The vector representation system 100 is an example of a system implemented as computer programs on one or more computers in one or more locations, in which the systems, components, and techniques described below can be implemented.

The vector representation system 100 generates word scores for sequences of words from input documents, e.g., word scores 126 for a word sequence 106 from an input document 102. The word scores 126 for the word sequence 106 include a respective score for each word in a predetermined set of words, with the word score for a given word representing the predicted likelihood that the word follows the last word in the word sequence 106 in the input document.

As part of generating word scores for sequences of words in a given input document, the vector representation system 100 generates a document vector representation for the input document, e.g., a document vector representation 120 for an input document 102. The document vector representation generated by the vector representation system 100 is a vector representation of the document. For example, the document vector representations may be vectors of floating-point values or of quantized floating-point values.

In particular, the vector representation system 100 includes a neural network system 110 that, for a given word sequence in a given input document, receives data identifying the input document and the word sequence and processes the data identifying the input document and the word sequence to generate the word scores for the word sequence. For example, the vector representation system 100 can receive a document identifier 104 for the input document 102 and the word sequence 106 from the input document 102 and generate the word scores 126 for the word sequence 106. The document identifier may be, e.g., pre-assigned to the input document 102 or be generated by the vector representation system 100 such that the identifier uniquely identifies the input document 102.

The neural network system 110 includes an embedding layer 112, a combining layer 114, and a classifier layer 116. The embedding layer 112 maps the data identifying the document to a document vector representation, e.g., the document vector representation 120 for the input document 102, in accordance with current values of a set of document parameters. The embedding layer 112 also maps each word in the word sequence to a respective word vector representation, e.g., word vector representations 122 for the words in the word sequence 106, in accordance with current values of a set of word parameters. Each word vector is a vector representation of the corresponding word, e.g., a vector of floating point or quantized floating point values.

The combining layer 114 receives the document vector representation and the word vector representations and generates a combined representation from the document vector representation and the word vector representations, e.g., a combined representation 124 from the word vector representations 122 and the document vector representation 120. Generating the combined representation is described in more detail below with reference to FIGS. 3 and 4.

The classifier layer 116 receives the combined representation and processes the combined representation to generate the word scores for the word sequence from the input document in accordance with current values of a set of classifier parameters. For example, the classifier layer 116 may process the combined representation 124 to generate the word scores 126 for the word sequence 106.

The vector representation system 100 trains the neural network system 110 on multiple word sequences from training documents in order to determine trained values of the word parameters and the classifier parameters. Training the neural network system is described in more detail below with reference to FIGS. 2 and 3. Once trained values of the word parameters and the classifier parameters have been determined, the vector representation system 100 can receive a new input document and process sequences of words from the new input document using the neural network system 110 to determine a document vector representation for the new document. Generating a document vector representation for a new document is described in more detail below with reference to FIGS. 2 and 4.

Once the document vector representation for a given document has been generated, the vector representation system 100 can associate the document vector representation with the document in a repository or provide the document representation to a separate system for use for some immediate purpose. For example, the document representation can be used as a feature of the input document and can be provided as input to a conventional machine learning system, e.g., a logistic regression system, a Support Vector Machines (SVM) system, or a k-means system, that has been configured to classify input documents, e.g., as relating to particular topics. For example, the conventional machine learning system may be configured to receive the document representation of the input document and, optionally, other features of the input document and generate a respective score for each of a set of topics, with each score representing an estimated likelihood that the document is about or relates to the corresponding topic.

Figure 2:
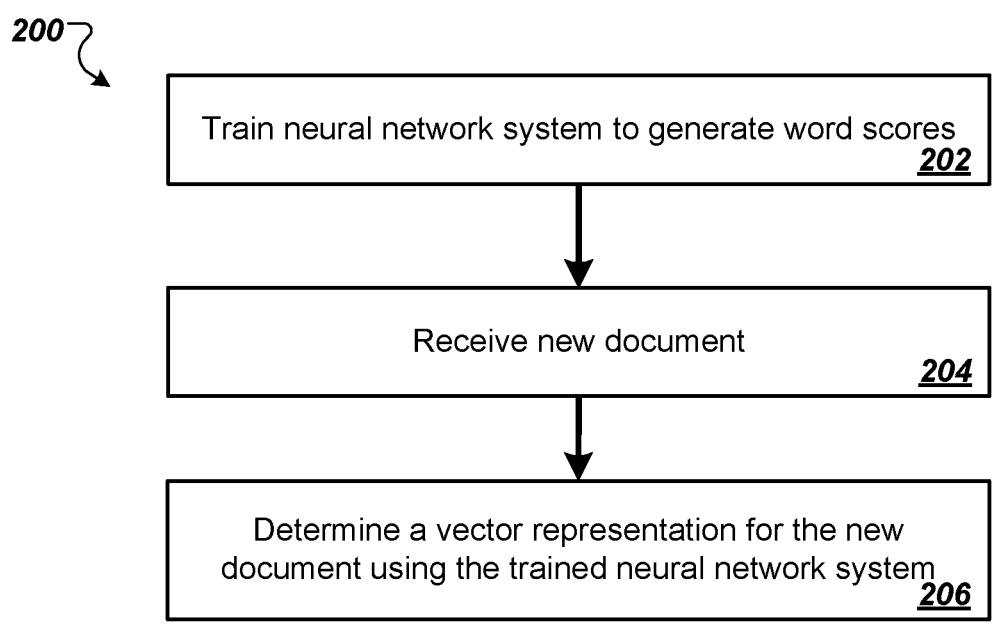
FIG. 2 is a flow diagram of an example process for determining a document vector representation for a new document.

FIG. 2 is a flow diagram of an example process 200 for determining a document vector representation for a new document. For convenience, the process 200 will be described as being performed by a system of one or more computers located in one or more locations. For example, a vector representation system, e.g., the vector representation system 100 of FIG. 1, appropriately programmed, can perform the process 200.

The system trains a neural network system, e.g., the neural network system 110 of FIG. 1, to generate word scores (step 202). The neural network system is a system that includes an embedding layer, a combining layer, and a classifier layer. The embedding layer is configured to receive data identifying a document and a sequence of words from the document, map the data identifying the document to a document vector representation in accordance with current values of a set of document parameters, and map each word in the sequence of words to a respective word vector representation in accordance with current values of a set of word parameters. The combining layer is configured to combine the word vector representations and the document vector representation to generate a combined representation. The classifier layer is configured to process the combined representation to generate a set of word scores for the word sequence in accordance with current values of a set of classifier parameters.

During the training, the system adjusts the values of the word parameters and the classifier parameters to determine trained values of the word parameters and the classifier parameters. In particular, the system trains the neural network system on a set of word sequences from a set of training documents. The training documents may include, for example, one or more of: sentences, paragraphs, collections of multiple paragraphs, search queries, or other collections of multiple natural language words.

To adjust the values of the parameters of the neural network system, the system performs an instance of a gradient descent training procedure for each of the training sequence. In particular, the system processes the sequence of words using the neural network system to generate word scores for the sequence and then adjusts the values of the parameters using the word scores and the word that follows the last word in the sequence in the training document, i.e., using gradient descent and backpropagation. Adjusting the parameters of the neural network system using a word sequence from a training document is described in more detail below with reference to FIG. 3.

Because the system uses only the word scores for the word sequence and the word that follows the last word in the word sequence in the training document in order to adjust the values of the parameters of the neural network system, the training documents do not need to be labeled to be used in training the neural network system. That is, the system can train the neural network system to generate word scores using only sequences of words from unlabeled training documents, i.e., documents that have not been classified as relating to any particular topic or otherwise been processed by a text classification system.

The system receives a new document (step 204). The new document may be, for example, a sentence, a paragraph, a collection of multiple paragraphs, a search query, or another collection of multiple natural language words.

The system determines a document vector representation for the new document using the trained neural network system (step 206). Generally, the system processes multiple word sequences from the new document using the trained neural network system to determine the document vector representation for the new document. In particular, the system identifies multiple sequences of words from the new document. In some implementations, each of the sequences is a fixed length, i.e., includes the same fixed number of words. For example, the system can apply a sliding window to the new document to extract each possible sequence of a predetermined fixed length from the new document.

The system can then process each of the extracted sequences using the trained neural network system in order to iteratively determine the document vector representation for the new document. That is, the system adjusts the current representation of the new document after each sequence from the new document is processed through the trained neural network sequence to generate word scores for the sequence. Adjusting a document vector representation for a new document using a sequence from the new document is described in more detail below with reference to FIG. 4.

Figure 3:
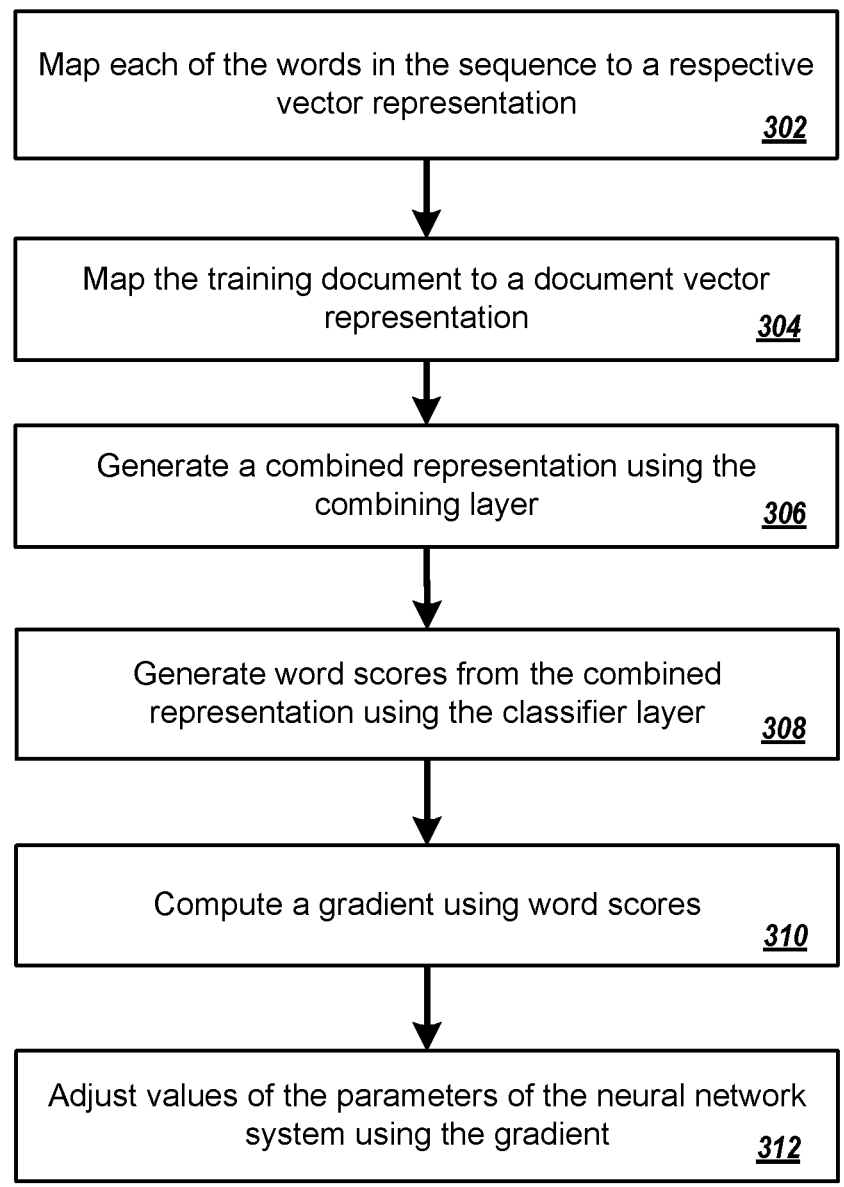
FIG. 3 is a flow diagram of an example process for training a neural network system on a sequence of words from a training document.

FIG. 3 is a flow diagram of an example process 300 for training a neural network system on a sequence of words from a training document. For convenience, the process 300 will be described as being performed by a system of one or more computers located in one or more locations. For example, a vector representation system, e.g., the vector representation system 100 of FIG. 1, appropriately programmed, can perform the process 300.

The system maps each of the words in the sequence to a respective word vector representation using the embedding layer (step 302). In particular, the system processes each word in the sequence in accordance with current values of the word parameters to determine a respective word vector representation for each of the words in the sequence.

The system maps the training document to a document vector representation using the embedding layer (step 304). In particular, the system processes the data identifying the training document in accordance with current values of the document parameters to determine a document vector representation for the training document.

The system generates a combined representation from the word vector representations and the document vector representation using the combining layer (step 306). In particular, the system processes the word vector representations and the current document vector representation using the combining layer to generate the combined representation. For example, the combining layer may concatenate the word vector representations and the current document vector representation to generate the combined representation. As another example, the combining layer may compute a measure of central tendency, e.g., a mean, median, or other average, of the word vector representations and the current document vector representation to generate the combined representation.

The system generates word scores from the combined representation using the classifier layer (step 308). In particular, the system processes the combined representation using the classifier layer and in accordance with current values of the parameters of the classifier layer to generate a respective word score for each word in the predetermined set of words.

The system computes a gradient using the word scores (step 310). That is, the system computes an error between the word scores and the desired output for the sequence of words, i.e., a set of word scores that indicates that the word that actually follows the last word in the sequence in the new document is the next word in the sequence, and then computes the gradient of the error.

The system adjusts current values of the parameters of the neural network system using the gradient (step 312). In particular, the system adjusts the current values of the parameters of the classifier layer using the gradient of the error and then adjusts the current values of the parameters of the embedding layer, i.e., the current values of the document parameters and the word parameters, using backpropagation.

The system can perform the process 300 for each of multiple training sequences from multiple training documents in order to iteratively determine the trained values of the parameters of the document. For example, for each iteration of the process 300, the system can randomly select a training document and a fixed length sequence of words from the training document. The system can then perform iterations of the process 300 on sequences from training documents until each possible sequence has been processed or until other termination criteria for the training have been satisfied.

Suppose that there are N documents in the corpus, M words in the vocabulary, and we want to learn document vectors such that each document is mapped to p dimensions and each word is mapped to q dimension, then the neural network system has the total of N×p+M×q parameters. Even though the number of parameters can be large when N is large, the updates during training are typically sparse and thus efficient.

Figure 4:
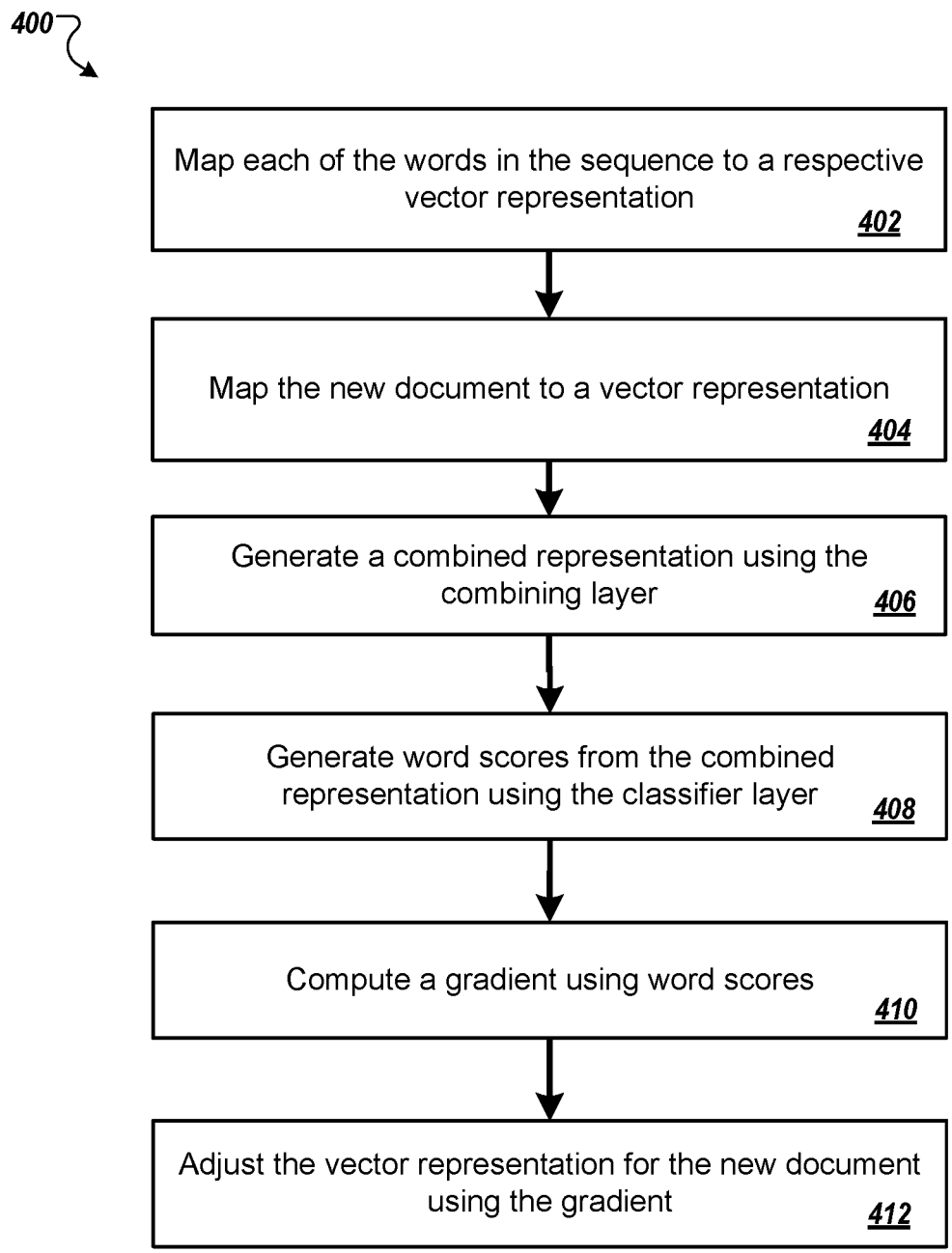
FIG. 4 is a flow diagram of an example process for adjusting the document vector representation for a new document.

FIG. 4 is a flow diagram of an example process 400 for adjusting the document vector representation for a new document. For convenience, the process 400 will be described as being performed by a system of one or more computers located in one or more locations. For example, a vector representation system, e.g., the vector representation system 100 of FIG. 1, appropriately programmed, can perform the process 400.

The system receives a sequence of words from the new document (step 402). For example, the sequence of words may be a fixed length sequence of words that has been extracted from the new document.

The system maps each of the words in the sequence to a respective vector representation (step 404). That is, the system processes each of the words in the sequence using the embedding layer to map each word to a word vector representation in accordance with trained values of the word parameters.

The system maps the new document to a document vector representation (step 406). That is, the system processes data identifying the new document using the embedding layer to map the new document to a document vector representation in accordance with current values of the document parameters.

The system generates a combined representation using the combining layer (step 406). In particular, the system processes the word vector representations and the document vector representation using the combining layer to generate the combined representation. For example, the combining layer may concatenate the word vector representations and the current document vector representation to generate the combined representation. As another example, the combining layer may compute a measure of central tendency, e.g., a mean, median, or other average, of the word vector representations and the current document vector representation to generate the combined representation.

The system generates word scores from the combined representation using the classifier layer (step 408). In particular, the system processes the combined representation using the classifier layer and in accordance with the trained values of the parameters of the classifier layer to generate a respective word score for each word in the predetermined set of words.

The system computes a gradient using the word scores (step 410). That is, the system computes an error between the word scores and the desired output for the sequence of words, i.e., a set of word scores that indicates that the word that actually follows the last word in the sequence in the new document is the next word in the sequence, and then computes the gradient of the error.

The system adjusts the vector representation for the new document using the gradient (step 412). That is, the system holds the trained values of the parameters of the classifier layer and the word parameters fixed and updates the current values of the document parameters using backpropagation.

The system then uses the updated values of the document parameters when computing the document vector representation for the next sequence of words from the new document. Alternatively, if the current sequence of words is the last sequence to be processed from the new document, the system computes an adjusted document vector representation of the new document using the updated values of the document parameters and uses the adjusted document vector representation as the document representation of the new document.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
    obtaining a new document, wherein the new document includes a plurality of sequences of words, and, for each sequence of words, a word that follows a last word in the sequence of words in the new document; and
    determining a vector representation for the new document using a trained neural network system,
    wherein the trained neural network system has been trained on a plurality of unlabeled documents and has been trained to process (i) a document identifier assigned to an input document and (ii) a sequence of words from the input document to generate a respective word score for each word in a pre-determined set of words, wherein the respective word score represents a predicted likelihood that a corresponding word follows a last word in the sequence of words in the input document, and
    wherein determining the vector representation for the new document using the trained neural network system comprises, for each iteration step of multiple iteration steps, processing (i) a document identifier assigned to the new document and (ii) one of the plurality of sequences of words by the trained neural network system to determine the vector representation for the new document, wherein the vector representation for the new document is iteratively updated using gradient descent.

2. The method of claim 1, further comprising providing the vector representation of the new document as an input to a machine learning system.

3. The method of claim 1, wherein generating respective word scores comprises:
    mapping (i) the document identifier assigned to the input document and (ii) each word in the sequence of words from the input document to respective vector representations using an embedding layer of the trained neural network,
    combining the vector representations into a combined representation using a combining layer of the trained neural network, and
    generating the respective word scores for each word in the sequence of words based on the combined representation using a classifier layer of the trained neural network.

4. The method of claim 3, wherein the embedding layer maps words in the sequence of words to vector representations in accordance with a first set of parameters, and wherein the classifier layer generates the word scores from the combined representation in accordance with a second set of parameters.

5. The method of claim 4, wherein values of the first set of parameters and values of the second set of parameters are fixed from training the trained neural network system to generate the word scores.

6. The method of claim 3, wherein determining the vector representation for the new document using the trained neural network system comprises performing, at each iteration step of the multiple iteration steps, a respective gradient descent with respect to an error function for the sequence of words at the iteration step to update the vector representation of the new document.

7. The method of claim 6, wherein the performing, at each iteration step of the multiple iteration steps, the respective gradient descent with respect to the error function for the sequence of words at the iteration step comprises:
    mapping each of the words in the sequence of words to a vector representation using the embedding layer;
    combining the vector representation for the words in the sequence of words with the vector representation for the new document from the previous iteration to generate a combined representation;
    generating word scores from the combined representation;
    computing a gradient with respect to the error function using the word scores and the word that follows the sequence of words in the new document; and
    adjusting the vector representation for the new document from the previous iteration using the gradient.

8. The method of claim 3, wherein the combining layer is configured to concatenate the vector representations of the words in the sequence of words with the vector representation of the input document.

9. The method of claim 3, wherein the combining layer is configured to average the vector representations of the words in the sequence of words and the vector representation of the input document.

10. The method of claim 1, wherein each of the plurality of sequences of words contains a fixed number of words.

11. A system comprising:
    one or more computers and one or more storage devices on which are stored instructions that are operable, when executed by the one or more computers, to cause the one or more computers to perform operations comprising:

obtaining a new document, wherein the new document includes a plurality of sequences of words, and, for each sequence of words, a word that follows a last word in the sequence of words in the new document; and determining a vector representation for the new document using a trained neural network system, wherein the trained neural network system has been trained on a plurality of unlabeled documents and has been trained to process (i) a document identifier assigned to an input document and (ii) a sequence of words from the input document to generate a respective word score for each word in a pre-determined set of words, wherein the respective word score represents a predicted likelihood that a corresponding word follows a last word in the sequence of words in the input document, and wherein determining the vector representation for the new document using the trained neural network system comprises, for each iteration step of multiple iteration steps, processing (i) a document identifier assigned to the new document and (ii) one of the plurality of sequences of words by the trained neural network system to determine the vector representation for the new document, wherein the vector representation for the new document is iteratively updated using gradient descent.

12. The system of claim 11, further comprising providing the vector representation of the new document as an input to a machine learning system.

13. The system of claim 11, wherein generating respective word scores comprises:

mapping (i) the document identifier assigned to the input document and (ii) each word in the sequence of words from the input document to respective vector representations using an embedding layer of the trained neural network, combining the vector representations into a combined representation using a combining layer of the trained neural network, and generating the respective word scores for each word in the sequence of words based on the combined representation using a classifier layer of the trained neural network.

14. The system of claim 13, wherein the embedding layer maps words in the sequence of words to vector representations in accordance with a first set of parameters, and wherein the classifier layer generates the word scores from the combined representation in accordance with a second set of parameters.

15. The system of claim 14, wherein values of the first set of parameters and values of the second set of parameters are fixed from training the trained neural network system to generate the word scores.

16. The system of claim 13, wherein determining the vector representation for the new document using the trained neural network system comprises performing, at each iteration step of the multiple iteration steps, a respective gradient descent with respect to an error function for the sequences of words at the iteration step to update the vector representation of the new document.

17. The system of claim 16, wherein the performing, at each iteration step of the multiple iteration steps, the respective gradient descent with respect to an error function for the sequence of words at the iteration step comprises:

mapping each of the words in the sequence of words to a vector representation using the embedding layer;

combining the vector representation for the words in the sequence of words with the vector representation for the new document from the previous iteration to generate a combined representation;

generating word scores from the combined representation;

computing a gradient with respect to the error function using the word scores and the word that follows the sequence of words in the new document; and adjusting the vector representation for the new document from the previous iteration using the gradient.

18. The system of claim 13, wherein the combining layer is configured to concatenate the vector representations of the words in the sequence of words with the vector representation of the input document.

19. The system of claim 13, wherein the combining layer is configured to average the vector representations of the words in the sequence of words and the vector representation of the input document.

20. One or more non-transitory computer-readable storage media encoded with instructions that, when executed by one or more computers, cause the one or more computers to perform operations comprising:

obtaining a new document, wherein the new document includes a plurality of sequences of words, and, for each sequence of words, a word that follows a last word in the sequence of words in the new document; and determining a vector representation for the new document using a trained neural network system, wherein the trained neural network system has been trained on a plurality of unlabeled documents and has been trained to process (i) a document identifier assigned to an input document and (ii) a sequence of words from the input document to generate a respective word score for each word in a pre-determined set of words, wherein the respective word score represents a predicted likelihood that a corresponding word follows a last word in the sequence of words in the input document, and wherein determining the vector representation for the new document using the trained neural network system comprises, for each iteration of multiple iterations, processing (i) a document identifier assigned to the new document and (ii) one of the plurality of sequences of words by the trained neural network system to determine the vector representation for the new document, wherein the vector representation for the new document is iteratively updated using gradient descent.

* * * * *